United States Patent
Wang et al.

(10) Patent No.: US 9,831,730 B2
(45) Date of Patent: Nov. 28, 2017

(54) WOUND STATOR FOR ALTERNATING-CURRENT GENERATOR

(71) Applicant: Victory Industrial Corporation, New Taipei (TW)

(72) Inventors: Chun-Yuan Wang, New Taipei (TW); Ming-Laang Liou, New Taipei (TW)

(73) Assignee: Victory Industrial Corporation, New Taipei (TW)

( * ) Notice: Subject to any disclaimer, the term of this patent is extended or adjusted under 35 U.S.C. 154(b) by 396 days.

(21) Appl. No.: 14/467,060

(22) Filed: Aug. 25, 2014

(65) Prior Publication Data

US 2016/0006308 A1    Jan. 7, 2016

(30) Foreign Application Priority Data

Jul. 1, 2014    (TW) .............................. 103122779 A (51) Int. Cl.
*H02K 3/04* (2006.01)
*H02K 3/12* (2006.01)
(Continued)

(52) U.S. Cl.
CPC ............... *H02K 3/12* (2013.01); *H02K 1/165* (2013.01); *H02K 3/345* (2013.01); *H02K 2213/03* (2013.01)

(58) Field of Classification Search
CPC ... H02K 15/0478; H02K 15/0492; H02K 3/12
(Continued)

(56) References Cited

U.S. PATENT DOCUMENTS 5,113,573 A    5/1992   Taji et al.
6,501,204 B1   12/2002  Oohashi et al.
(Continued)

FOREIGN PATENT DOCUMENTS

CN    1669201 A    9/2005
CN    2785235 Y    5/2006
(Continued)

OTHER PUBLICATIONS

Examination Report of related Australian patent application 2014 213 479 dated Feb. 27, 2015.
(Continued)

*Primary Examiner* — Hanh Nguyen
(74) *Attorney, Agent, or Firm* — Clifford Perry (57) ABSTRACT

The present invention relates to a wound stator. The wound stator comprises: a stator and a plurality of wires. The stator comprises: an annular body and a plurality of radial grooves defined therein. The annular body has a plurality of separating posts protruding inwardly and radially from an inner circumference of the annular body. An end of each of the separating posts extends from its two sides to form a plurality of magnetic shoes. The plurality of radial grooves is defined between the separating posts. Each of the grooves has an opening defined between adjacent two of the plurality of magnetic shoes. The plurality of wires comprises: a first end, a second end, and a plurality of wave-shaped coils located between the first end and second end. Each wave-shaped coil is formed of straight portions and curved portions that alternate with each other.

14 Claims, 10 Drawing Sheets

(51) Int. Cl.
*H02K 3/34* (2006.01)
*H02K 1/16* (2006.01)

(58) Field of Classification Search
USPC .................. 310/201, 202, 206, 207, 208
See application file for complete search history.

(56) References Cited

U.S. PATENT DOCUMENTS

| | | | |
|---|---|---|---|
| 6,703,750 | B2 | 3/2004 | Nakamura |
| 6,742,238 | B2 | 6/2004 | Lee |
| 6,960,857 | B2 | 11/2005 | Oohashi et al. |
| 7,026,735 | B2 * | 4/2006 | Akita ............... H02K 3/50 310/184 |
| 8,186,039 | B2 * | 5/2012 | Kamakura ........... H02K 3/12 29/596 |
| 8,296,926 | B2 | 10/2012 | Wang et al. |
| 8,393,072 | B2 * | 3/2013 | Bodin ............ H02K 15/0478 29/596 |
| 8,789,259 | B2 * | 7/2014 | Stephenson ........... H02K 1/16 29/596 |
| 2002/0158539 | A1 | 10/2002 | Oohashi et al. |
| 2003/0011268 | A1 * | 1/2003 | Even ................. H02K 3/12 310/179 |
| 2004/0261256 | A1 | 12/2004 | Sadiku |
| 2005/0046297 | A1 | 3/2005 | Chen et al. |
| 2005/0082923 | A1 | 4/2005 | Akita et al. |
| 2005/0194844 | A1 | 9/2005 | Becherucci et al. |
| 2006/0033397 | A1 | 2/2006 | Asao et al. |
| 2009/0096311 | A1 * | 4/2009 | Even ................. H02K 3/12 310/198 |
| 2010/0259124 | A1 | 10/2010 | Bodin et al. |
| 2010/0325874 | A1 | 12/2010 | Wang et al. |
| 2011/0041318 | A1 * | 2/2011 | Akimoto ......... H02K 15/0478 29/596 |
| 2012/0112600 | A1 * | 5/2012 | Kondou ............. H02K 1/16 310/216.086 |
| 2013/0241369 | A1 | 9/2013 | Imazawa et al. |

FOREIGN PATENT DOCUMENTS

| | | |
|---|---|---|
| CN | 1272890 C | 8/2006 |
| CN | 1813392 A | 8/2006 |
| CN | 101084618 A | 12/2007 |
| CN | 101595623 A | 12/2009 |
| CN | 101689777 A | 3/2010 |
| CN | 102738938 A | 10/2012 |
| CN | 103262391 A | 8/2013 |
| CN | 103780029 A | 5/2014 |
| DE | 60223325 T2 | 8/2008 |
| EP | 1 120 881 A2 | 8/2001 |
| EP | 1294076 B1 | 11/2007 |
| IN | 210 726 B | 3/2007 |
| JP | 2002051512 A | 2/2002 |
| JP | 2004229460 A | 8/2004 |
| JP | 2009112186 A | 5/2009 |
| JP | 2011142798 A | 7/2011 |
| JP | 2014023239 A | 2/2014 |
| JP | 2014090614 A | 5/2014 |

OTHER PUBLICATIONS

Examination Report of related European patent application EP 14 182 967 dated Jul. 4, 2016.
Translation of Examination Report of related Japanese patent application JP 2015-016582 dated Jan. 13, 2016.
Examination Report of related European patent application EP 14 182 968 dated Jul. 4, 2016.
Examination Report of related European patent application EP 14 182 969 dated Jul. 5, 2016.
Office Action in related U.S. Appl. No. 14/467,058 dated Jul. 10, 2017.
Office Action in related U.S. Appl. No. 14/467,062 dated Sep. 6, 2017.

* cited by examiner

WOUND STATOR FOR ALTERNATING-CURRENT GENERATOR

CROSS-REFERENCE TO RELATED APPLICATIONS

The present invention claims the benefit of priority of Taiwan application TW 103122779 of Jul. 1, 2014, entitled "Wound Stator for Alternating-Current Generator," the contents of which are herein incorporated by reference.

BACKGROUND

Field of the Invention

The present invention relates to a wound stator, more particularly to a wound stator for a vehicle alternating-current generator.

Description of Related Art

An alternating-current generator is used for converting mechanical energy into alternating-current electric energy. In a vehicle alternating-current generator, the output power of an engine drives a rotor of the generator to rotate within a stator to convert mechanical energy of the engine into electric energy to charge a storage battery, which then supplies electric energy to electrical parts of a vehicle.

A vehicle alternating-current generator typically has an annular stator and a rotor. By means of rapid rotation of the rotor in the stator, magnetic fields are formed by wires wound on the stator so as to generate an induced electromotive force (voltage) in the wires. In general, the voltage output by the alternating-current generator is proportional to the number of coil groups in a stator ring. Therefore, the higher the density of wires wound on a stator ring, the higher the power generation of the generator.

Figure 1:
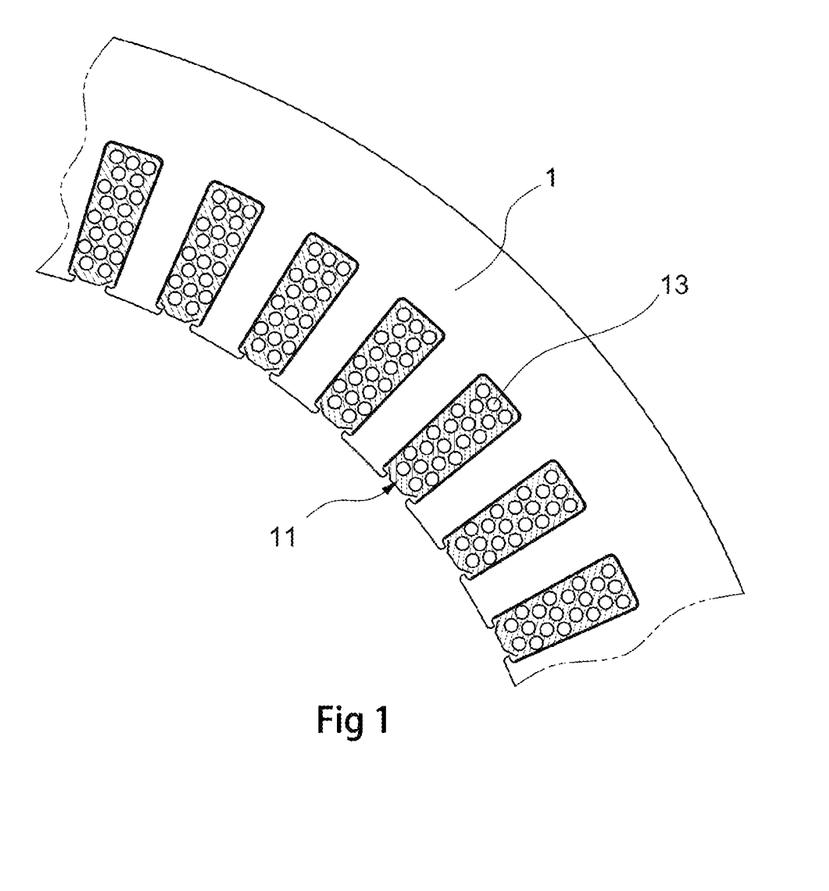
FIG. 1 is a partial sectional view of a conventional stator winding.

Folding and winding are usually used for a coil winding in a conventional generator. To achieve high power generation, a large number of coils are used, and thus the winding and folding become complex. Furthermore, a large stator ring is required for such winding to provide sufficient space for the coils. However, the conventional windings have disadvantages. For example, the width of the elongated groove of the stator ring has to be large to receive a number of wires and the received wires are inevitably disorderly arranged, which results in a number of air gaps. FIG. 1 is a partial sectional view of a conventional stator winding, where each groove 11 in a stator 1 receives multiple wires 13 and slant lines represent air gaps between wires and groove walls or between different wires. These air gaps result in an undesirable increase of magnetic resistance which lowers power generation efficacy. In addition, since the stator ring is large, the corresponding rotor also has to be large so that the two can fit each other, which increases the size of the generator that comprises them. A large generator will limit the usable space of a vehicle.

U.S. Pat. No. 8,296,926 discloses a small-sized stator of an alternating-current generator having high wire density in a groove of the stator. In the stator, copper wires with rectangular cross-sections (a flat copper wire) are required. The copper wires are bent into U-shaped/V-shaped wire units, which thereafter are inserted in the grooves of a stator ring, and the ends of the wire units are then soldered two by two to form a circuit. Accordingly, the wires are orderly arranged so as to effectively reduce air gaps, increase wire density, and decrease magnetic resistance (see FIGS. 10 and 11). However, many wire ends will jut out from the stator ring. For example, in a stator ring having 96 grooves in which each groove has two wire units, after wire insertion is completed, there are a total of 384 wire ends and 192 solder joints, and the process for manufacturing such stator may be complex. In addition, the flat copper wire used in such stator may be more expensive than a round copper wire.

Given the above, there is need for a stator that is miniature, easy to manufacture and has high power generation efficacy with low cost and a generator having such stator.

BRIEF SUMMARY OF THE INVENTION

In one embodiment of the invention, a wire for a stator of an alternating-current generator is provided, which comprises: a first end, a second end, and a plurality of wave-shaped coils located between the first end and second end. Each wave-shaped coil is formed of straight portions and curved portions that alternate with each other.

In another embodiment of the invention, a wound stator for an alternating-current generator is provided, which comprises: a stator, having a plurality of radial grooves arranged at an inner circumference of the stator; and a plurality of wires for the stator. Each wire comprises: a first end, a second end, and a plurality of wave-shaped coils located between the first end and second end. Each wave-shaped coil is formed of straight portions and curved portions that alternate with each other. The straight portions of each wire are sequentially embedded in corresponding grooves of the stator, so that each of the grooves is embedded with the wires.

In yet another embodiment of the invention, a stator for an alternating-current generator is provided, which has an annular body. A plurality of separating posts protruding inward radially is provided at an inner circumference of the annular body. An end of each of the separating posts extends from its two sides to form a plurality of magnetic shoes. A plurality of radial grooves is defined between the separating posts, and each of the grooves has an opening defined between the magnetic shoes formed by the ends of adjacent separating posts. The width of each of the grooves is only sufficient for receiving one wire, and the width of the openings of the grooves is slightly larger than a wire diameter of the wire so that the wire is directly embedded in the grooves from the openings.

In a further embodiment of the invention, a wound stator for an alternating-current generator is provided, which comprises: a stator, and a plurality of wires for the stator. The stator comprises: an annular body and a plurality of separating posts protruding inward radially provided at an inner circumference of the annular body. An end of each of the separating posts extends from its two sides to form a plurality of magnetic shoes. A plurality of radial grooves is defined between the separating posts. Each of the grooves has an opening defined between the magnetic shoes formed by the ends of adjacent separating posts. Each of the plurality of wires for the stator comprises: a first end, a second end, and a plurality of wave-shaped coils located between the first end and second end, wherein each wave-shaped coil is formed of straight portions and curved portions that alternate with each other. The straight portions of each wire are (starting from the first end of the wire) sequentially embedded in corresponding grooves of the stator so that each of the plurality of grooves of the stator is embedded with the wire. The width of each of the plurality of grooves is only sufficient for receiving one wire, and the width of the openings of the plurality of grooves is slightly larger than the wire diameter of the straight portions of the wire so that the straight portions of the wire are directly embedded in the grooves from the openings.

In a further embodiment of the invention, a method of manufacturing a wound stator for an alternating-current generator is provided. The method comprises the following steps: (1) providing a stator having a plurality of radial grooves arranged at an inner circumference of the stator; (2) providing a plurality of wires for the stator, each wire comprising: a first end, a second end, and a plurality of wave-shaped coils located between the first end and second end, each wave-shaped coil being formed of straight portions and curved portions that alternate with each other; and (3) sequentially embedding the straight portions of each wire in corresponding grooves of the stator, so that each of the grooves is embedded with the wires.

In a further embodiment of the invention, a method of manufacturing a wound stator for an alternating-current generator is provided, which comprises the following steps: (1) providing a stator comprising: an annular body having a plurality of separating posts protruding inward radially provided at an inner circumference of the annular body, an end of each of the separating posts extending from its two sides to form a plurality of magnetic shoes; and a plurality of radial grooves defined between the separating posts, each of the grooves having an opening defined between the magnetic shoes formed by the ends of adjacent separating posts; (2) providing a plurality of wires for the stator, each wire comprising: a first end, a second end; and a plurality of wave-shaped coils located between the first end and second end, each wave-shaped coil being formed of straight portions and curved portions that alternate with each other; and (3) sequentially embedding, the straight portions of each wire, starting from the first end of the wire, in corresponding grooves of the stator, so that each of the plurality of grooves of the stator is embedded with the wire, wherein the width of each of the plurality of grooves is only sufficient for receiving one wire, and the width of the openings of the plurality of grooves is slightly larger than a wire diameter of the straight portions of the wire, so that the straight portions of the wire are directly embedded in the grooves from the openings.

In a further embodiment of the invention, a vehicle alternating-current generator is provided, which comprises: a wound stator, and a rotor. The wound stator comprises: a stator having a plurality of radial grooves arranged at an inner circumference of the stator and wires. Each wire comprises: a first end, a second end; and a plurality of wave-shaped coils located between the first end and second end. Each wave-shaped coil is formed of straight portions and curved portions that alternate with each other. The straight portions of each wire are sequentially embedded in corresponding grooves of the stator, so that each of the grooves is embedded with the wire. The rotor comprises a first claw magnetic pole piece and an opposite second claw magnetic pole piece. The first claw magnetic pole piece has a plurality of N pole claw bodies, and the second claw magnetic pole piece has S pole claw bodies of the same number as the plurality of N pole claw bodies of the first claw magnetic pole piece. When the first claw magnetic pole piece and the second claw magnetic pole piece are combined with each other, the plurality of N pole claw bodies of the first claw magnetic pole piece and the plurality of S pole claw bodies of the second claw magnetic pole piece are adjacent to each other and are arranged separately. The rotor is placed in the alternating-current generator stator winding in coaxial form.

In a further embodiment of the invention, a vehicle alternating-current generator is provided, which comprises: a wound stator and a rotor. The wound stator comprises: a stator having an annular body and a plurality of wires. A plurality of separating posts protruding inward radially is provided at an inner circumference of the annular body. An end of each of the separating posts extends from its two sides to form a plurality of magnetic shoes. A plurality of radial grooves is defined between the separating posts. Each of the grooves has an opening defined between the magnetic shoes formed by the ends of adjacent separating posts. Each wire comprises: a first end, a second end, and a plurality of wave-shaped coils located between the first end and second end. Each wave-shaped coil is formed of straight portions and curved portions alternating with each other. The straight portions of each wire are, starting from the first end of the wire, sequentially embedded in corresponding grooves of the stator, so that each of the plurality of grooves of the stator is embedded with the wire. The width of each of the plurality of grooves is only sufficient for receiving one wire, and the width of the openings of the plurality of grooves is slightly larger than a wire diameter of the straight portions of the wire, so that the straight portions of the wire are directly embedded in the grooves from the openings. The rotor comprises a first claw magnetic pole piece and an opposite second claw magnetic pole piece. The first claw magnetic pole piece has a plurality of N pole claw bodies, and the second claw magnetic pole piece has S pole claw bodies of the same number as the plurality of N pole claw bodies of the first claw magnetic pole piece. When the first claw magnetic pole piece and the second claw magnetic pole piece are combined with each other, the plurality of N pole claw bodies of the first claw magnetic pole piece and the plurality of S pole claw bodies of the second claw magnetic pole piece are adjacent to each other and are arranged separately. The rotor is placed in the wound stator in coaxial form.

DETAILED DESCRIPTION OF THE EXEMPLARY EMBODIMENTS

The characteristics, subject matter, advantages, and effects of the present invention are detailed hereinafter by reference to embodiments of the present invention and the accompanying drawings. It is understood that the drawings referred to in the following description are intended only for purposes of illustration and do not necessarily show the actual proportion and precise arrangement of the embodiments. Therefore, the proportion and arrangement shown in the drawings should not be construed as limiting or restricting the scope of the present invention.

Figure 2:
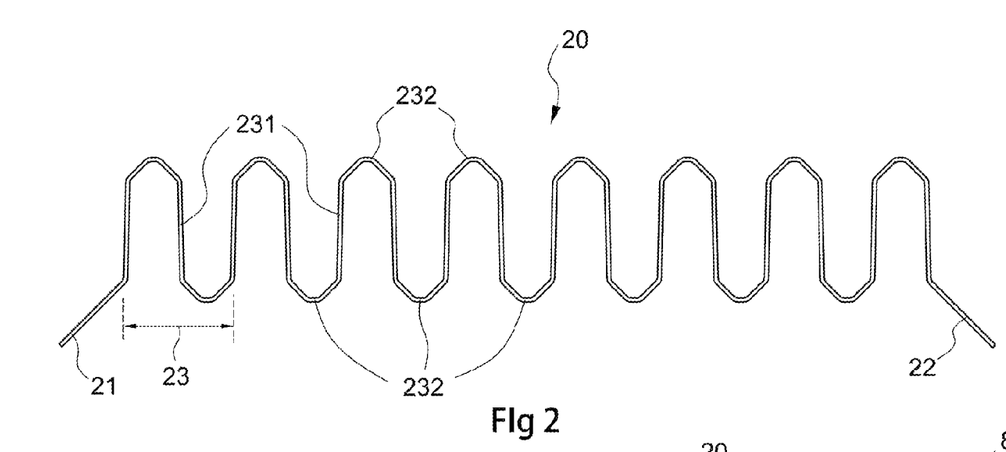
FIG. 2 is a schematic structural view of a wire for a stator according to an embodiment of the present invention.

FIG. 2 is a schematic view of a wire for a stator of a vehicle alternating-current generator according to one embodiment of the present invention. As shown in FIG. 2, a wire 20 includes a first end 21, a second end 22, and a plurality of wave-shaped coils 23 located between the first end 21 and the second end 22, and each wave-shaped coil 23 is formed by a plurality of straight portions 231 and a plurality of curved portions 232 that alternate with each other. For example, a wave-shaped coil 23 may be regarded as one sine shape formed of straight portion(s) 231 and curved portion(s) 232. The number of wave-shaped coils of the wire 20 may also be regarded as, for example, the number of curved portions 232 that open downwards in FIG. 2 (in FIG. 2, there are 8 curved portions 232). The number of wave-shaped coils of the wire 20 may be 6 to 8, or may be a larger number of turns, for example, 12 to 16. For the material of the wire 20, an enameled copper with a circular cross section is typically used. Alternatively, to increase wire density after the stator is assembled, the straight portion 231 of the wire 20 may be pressed flat by using a jig, making the cross section of the straight portion 231 into a square shape, a rectangular shape, an elliptic shape or the like that has flat side surfaces. The advantage of such an approach lies in that, compared with an approach in which a flat wire is used to increase wire density in a stator groove (to reduce an air gap ratio), the cost of using a flat copper wire is much higher than that of using a common round copper wire that is partially pressed flat later. This is because when a wire is wound in a stator groove, a curved part that is not in the stator groove does not have an air gap ratio problem; the use of a partially flattened wire of the present invention not only can achieve the same effects of increasing wire density and lowering air gap ratio between wires as using a flat wire but also effectively saves manufacturing cost. Certainly, a flat wire can be directly used to pursue desirable power generation efficacy. In this case, the cross sections of both the straight portion 231 and curved portion 232 would have a square shape, a rectangular shape, an elliptic shape or the like with flat sides.

Figure 3:
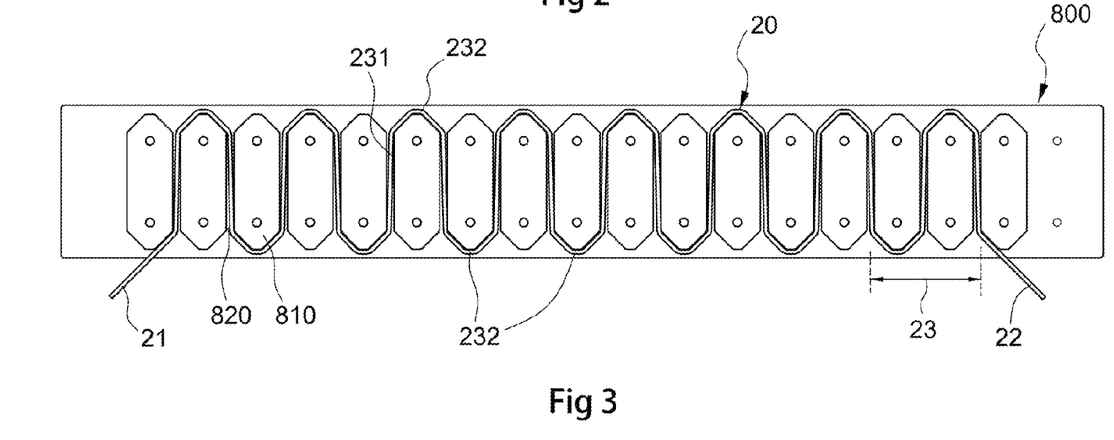
FIG. 3 is a schematic structural view of a wire template for fabricating a wire for a stator.

The wire 20 with the desired shape may be implemented by using a wire template 800, such as the one shown in FIG. 3. In a manufacturing process of the wire, a long and straight wire is bent along shaped contours of wire template bumps 810 and winds through gaps 820 in the wire template bumps 810 in an alternative manner. Since the contours of the wire template bumps 810 have shapes that conform to those of the straight portion 231 and the curved portion 232 of the wire 20 as shown in FIG. 2, through the above manufacturing process, the desired wave-shaped coils 23 having the straight portions 231 and the curved portions 232 that alternate with each other are formed.

Figure 4A:
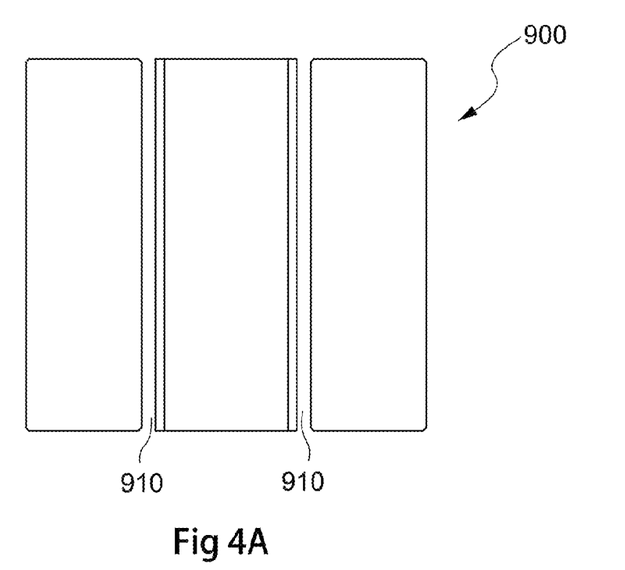
FIG. 4A is a schematic top view of a flattening jig.
Figure 4B:
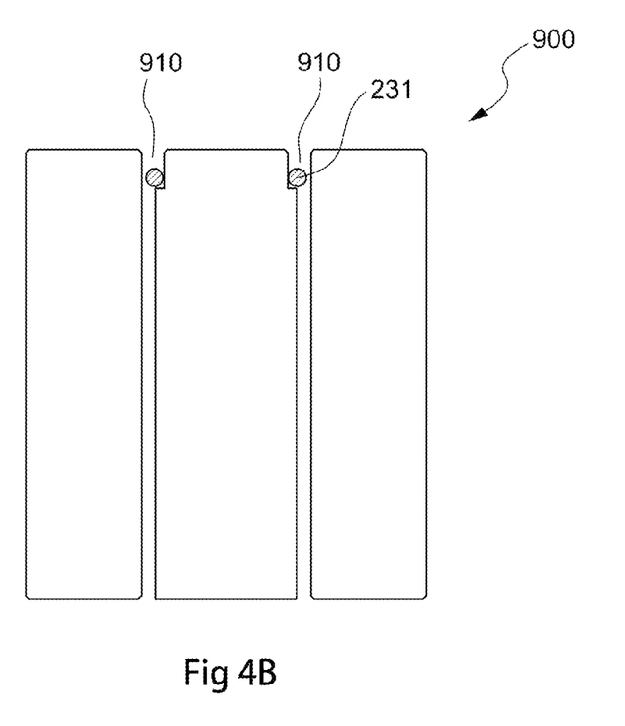
FIG. 4B is a schematic side view of the flattening jig.
Figure 4C:
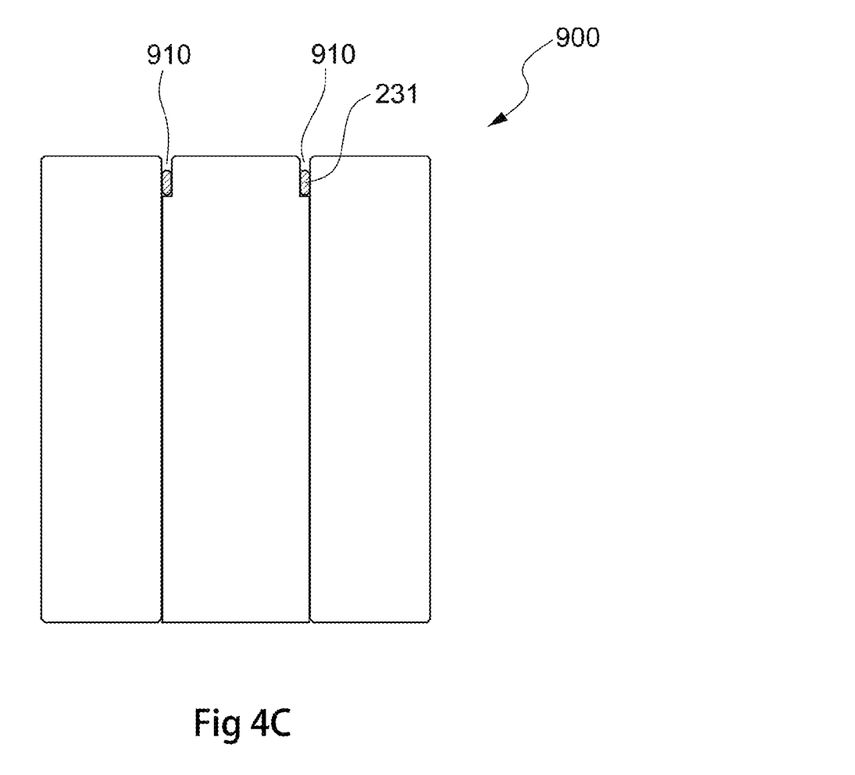
FIG. 4C is a schematic side view showing that the wires are flattened by the flattening jig.

Further, after the wire 20 is finished, a flattening jig may be used to implement flattening of the straight portions 231 to make the cross sections of the straight portions 231 into a noncircular shape, for example, as shown by the flattening jig 900 in FIG. 4A to FIG. 4C. FIG. 4A is a top view of a flattening jig 900, which has clamping grooves 910 to receive the straight portions 231 of the wire 20. Further, as shown in FIG. 4B, the straight portions 231 (circular cross sections) of the wire 20 may be placed inside the clamping grooves 910 of the flattening jig 900 and the wire 20 may be pressed from its sides to be flattened into the required shape or size, so as to obtain the flattening (noncircular) forms of the straight portions 231 of the wire 20 shown in FIG. 4C; in this case, the wire 20 is a partially flattened wire in which the curved portions 232 remain round in shape.

Figure 5A:
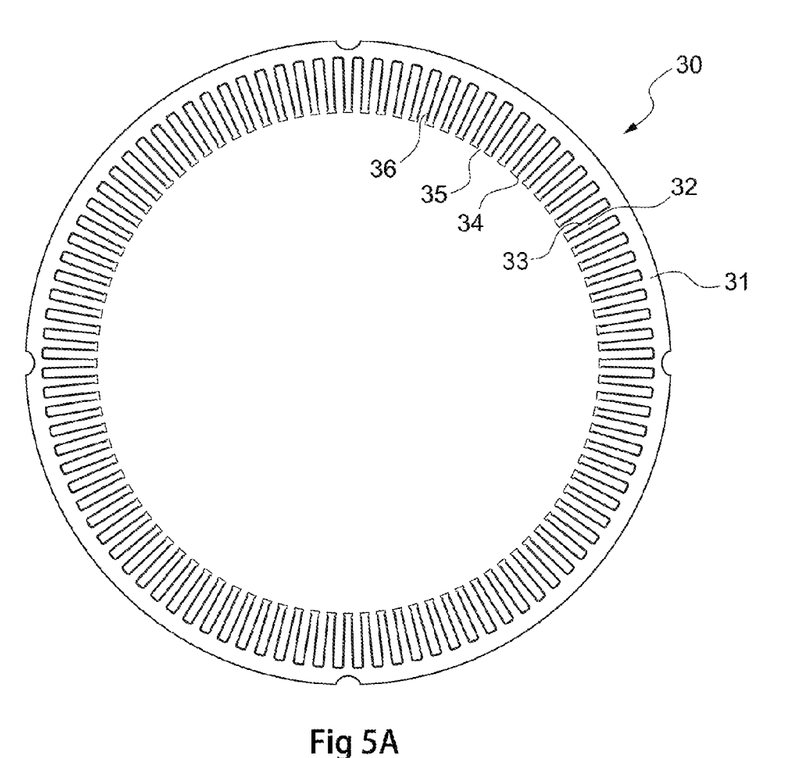
FIG. 5A is a schematic structural view of a stator ring according to an embodiment of the present invention.
Figure 5B:
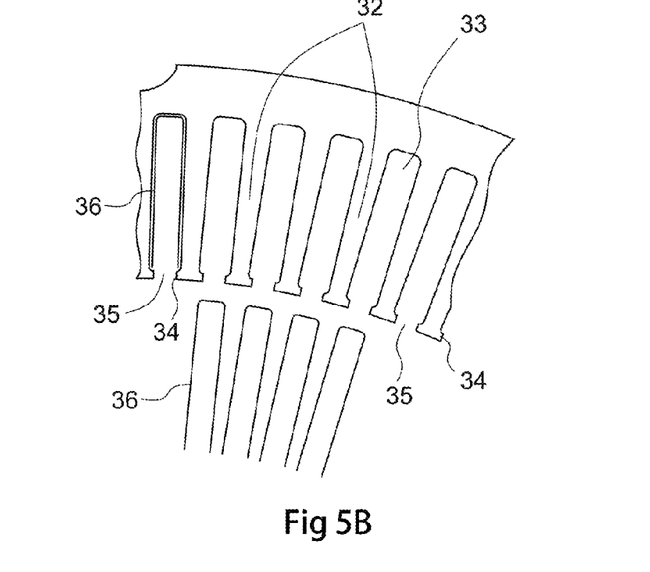
FIG. 5B is a partial, enlarged view of FIG. 5A.

FIG. 5A is a stator structure according to one embodiment of the present invention. As shown in FIG. 5A, a stator 30 has an annular body 31, where a plurality of radial elongated grooves 33 separated by separating posts 32 is arranged at an inner circumference of the stator. The number of grooves 33 is, for example, 72 to 96 (96 in FIG. 5). An end of the separating post 32 slightly protrudes from its two sides to form a magnetic shoe 34, and an opening 35 of the groove 33 is formed between two magnetic shoes 34. Generally speaking, the stator 30 is made of a material with desirable electrical and magnetic field properties, for example, cold-rolled steel plate (SPCC), silicon steel or other similar materials. An electrical insulating material 36 may be laid on the surface of the elongated groove 33 of the stator. As shown in FIG. 5B, for the electrical insulating material 36, a sheet-form material is folded to fit the shape of the surface of the radial elongated groove 33 inside the stator 30 and is directly embedded in the groove 33 to cover the surface of the groove 33. The electrical insulating material 36 can be made of a material such as pressed paper board, plastic film, polyester film, aramid paper, and epoxy resin.

The plurality of elongated grooves 33 of the stator 30 are used for winding of the wire 20. In particular, each straight portion B231 of the wave-shaped coil 23 of the wire 20 starts from the first end 21 of the wire 20, and is sequentially embedded in the corresponding grooves 33 of the stator 30 and juts out from one of the corresponding grooves with the second end of the wire 20. In this case, the groove 33 has one embedded layer of the wire 20. A plurality of layers of the wire 20 may be embedded in the same groove to increase power generation. The winding work for the stator 30 is completed by embedding multiple wave-shaped wires 20 in all the grooves 33 of the stator 30, such that each groove 33 has wires. The details of the winding work for the stator 30 are further illustrated below by way of an explanatory embodiment according to the present invention.

Figure 6A:
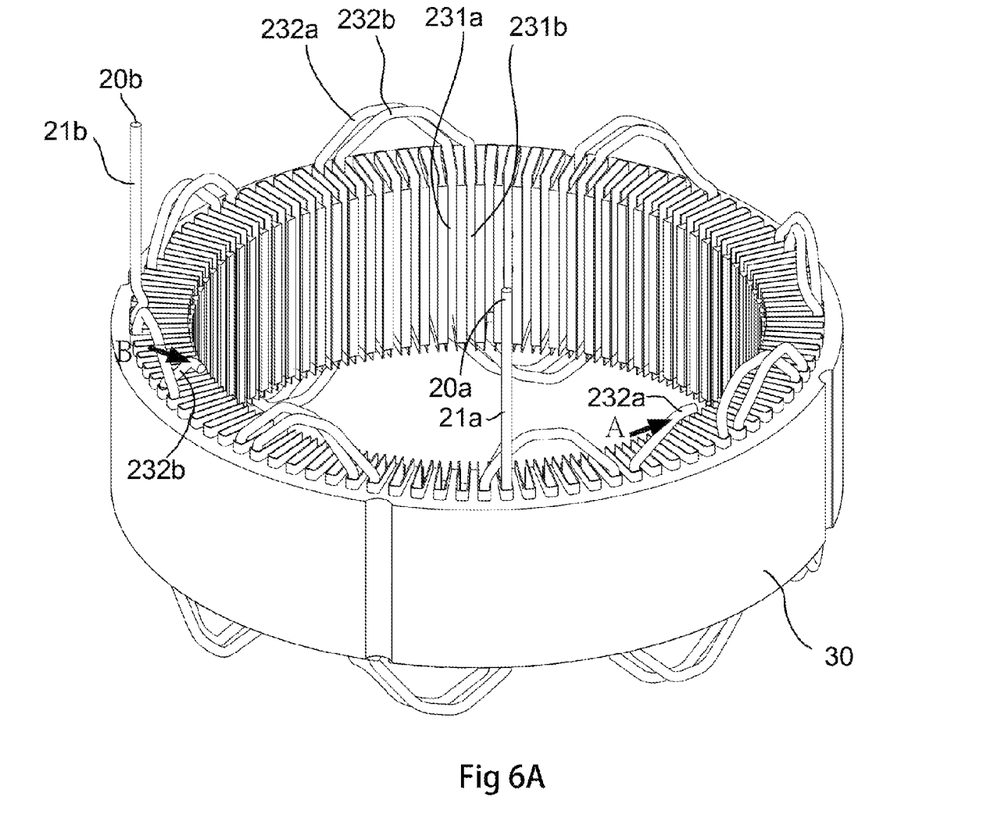
FIG. 6A is a schematic view of a stator winding according to an embodiment of the present invention, which shows the wires being embedded into two groups of grooves sequentially in a forward direction.
Figure 6B:
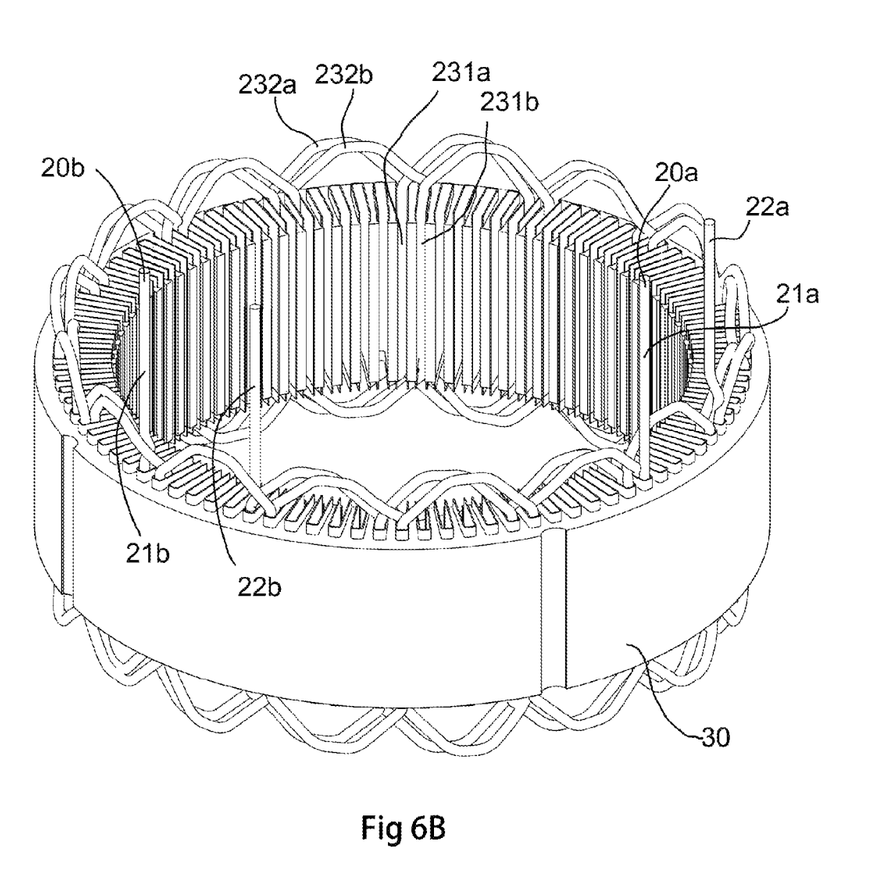
FIG. 6B is a schematic view of a stator winding according to an embodiment of the present invention, which shows that after the wires are embedded into the two groups of grooves in the forward direction in FIG. 6A, they are embedded therein in a reverse direction.

In FIG. 6A and FIG. 6B, a wave-shaped wire 20 for winding a stator 30 of the present invention is used. This embodiment shows how to fabricate a wound stator having two three-phase power generations. A stator 30 having 96 grooves and a wire 20 having 16 coils are provided. For each phase of power generation, 2 windings and 32 grooves 33 are involved, and for each winding, 16 grooves are involved. In other words, if the $1^{st}$ and $2^{nd}$ grooves and corresponding grooves (that is, the $7^{th}$ and 8th grooves, $13^{th}$ and $14^{th}$ grooves, . . . , $91^{st}$ and $92^{nd}$ grooves) are for a first phase, the $3^{rd}$ and $4^{th}$ grooves and corresponding grooves (that is, the $9^{th}$ and $10^{th}$ grooves, $15^{th}$ and $16^{th}$ grooves, . . . , and $93^{th}$ and $94^{th}$ grooves) are for a second phase, and the $5^{th}$ and $6^{th}$ grooves and corresponding grooves (that is, the $11^{th}$ and $12^{th}$ grooves, $17^{th}$ and $18^{th}$ grooves, . . . , and $95^{th}$ and $96^{th}$ grooves) are for a third phase. In this case, the 96 grooves 33 make a circle around the stator 30.

As shown in FIG. 6A, a straight portion 231a of a coil of the wire 20a starts from a first end 21a of the wire 20a and starts to be embedded in the $1^{st}$ groove from one of the plurality of grooves 33 of the stator 30; next, the straight portions 231a are sequentially embedded in a forward direction (e.g. clockwise) in the $7^{th}$ groove, $13^{th}$ groove, $19^{th}$ groove, $25^{th}$ groove, . . . till the $91^{st}$ groove to complete the winding of the wire around the entire circumference of the annular body 31 of the stator 30. When the wire 20a juts out from the $91^{st}$ groove (the groove corresponding to the arrow A in FIG. 6A), 8 coils out of the 16 coils of the wire 20a are left outside the grooves (not shown). Further, a straight portion 231b of a wire 20b, starting from the first end 21b of the wire 20b, is embedded in a groove (the $26^{th}$ groove from the $1^{st}$ groove in the clockwise direction in FIG. 6A) adjacent to a groove having the straight portion 231a of the wire 20a. Next, each straight portion 231b is sequentially embedded in a forward direction (e.g., clockwise) in a corresponding groove and is wound to the $20^{th}$ groove (the groove corresponding to arrow B in FIG. 6A) and juts out therefrom to complete an entire circumference in a forward direction. In this case, 8 coils out of the 16 coils of the wire 20b are left outside the groove (not shown). Next, referring to FIG. 6B, the other straight portions 231a of the wire 20a, starting from the $91^{st}$ groove, are embedded in a reverse direction (direction of arrow A; i.e., counterclockwise) in the corresponding grooves 33 that have wire embedded therein from the forward winding, and after reverse winding around the entire circumference of the stator 30, the second end 22a juts out from the $91^{st}$ groove. Similarly, the other straight portions 231b of the wire 20b, starting from the $20^{th}$ groove, are embedded in a reverse direction (direction of arrow B; i.e., counterclockwise) in corresponding grooves 33 that have wire embedded therein from the forward winding, and after the reverse winding around the entire circumference of the stator 30, the second end 22b juts out from the $20^{th}$ groove. In this way, the wires 20a and 20b are separately wound around the stator 30 by two turns (one turn in the forward direction and the other in the reverse direction) to complete the windings of the two wires (20a, 20b) for one phase (each of the windings of wires 20a and 20b is for the same phase), and four wire ends, that is, the first ends 21a and 21b and the second ends 22a and 22b, are left outside the grooves 33 of the stator 30. Subsequently, based on the foregoing manner, the wire 20 is sequentially embedded in the next two groups of grooves (the $3^{rd}$ and $4^{th}$ grooves and the corresponding grooves) for the second phase and the further next two groups of grooves (the $5^{th}$ and $6^{th}$ grooves and the corresponding grooves) for the third phase, so as to complete a stator winding having three phases of power generation windings; in this embodiment, each groove 33 of the stator 30 has straight portions 231 of two layers of wire 20.

However, to increase power generation and enhance power generation efficacy, the grooves are not limited to receiving only two layers of the straight portions 231 of wire 20. For example, in the foregoing two groups of grooves for the first phase, in the grooves where the second ends of the wire ends of the wires 20a and 20b respectively jut out, the same wires 20a and 20b are further embedded, wound around the stator 30 in a forward direction in the same manner and then the same wires are wound in a reverse direction around the stator 30 to complete the winding in the corresponding grooves. In this embodiment, each of the grooves of the stator 30 has four layers of wires. Thus, two first ends 21a, two first ends 21b, two second ends 22a, and two second ends 22b, that is, eight wire ends in total, are left outside of the grooves 33. In this manner, wires continue to be embedded in corresponding grooves for the second phase of winding and the third-phase of winding, so that two sets of stator windings for three-phase alternating-current generation in which a single groove 33 has straight portions 231 of four layers of wires 20 are completed. Subsequently, two wires 20 in the same group for the same phase are connected to each other in series, such as by a soldering manner. For example, the second end 22a of the wire 20a in the $91^{st}$ groove may be connected in series through soldering to the first end 21a of another wire 20a in the $91^{st}$ groove. Finally, the wires for the three phases are soldered in a Y-connection or in a connection of a star shape.

The stator winding and the structures of the wound stator disclosed in embodiments of the present invention have the advantages of significantly reducing the number of wire ends that jut out of the grooves of the stator ring and the solder joints for the different wire ends. For example, in the foregoing embodiment, the stator 30 of two three-phase windings in which a groove has four layers of wires has 12 wires 20 in total and therefore has 24 wire ends in total (12 first ends 21 and 12 second ends 22). Since first ends 21 and second ends 22 for the same phase are required to be serially connected, the wires 20 of two three-phase windings have 6 solder joints in total. Thereafter, if the two three-phase windings are soldered by a Y connection, two additional solder joints are needed. Thus, the wound stator of this embodiment has 8 solder joints in total. Compared with the wound stator in which the stator ring also has 96 grooves and each groove also has four layers of wires as disclosed in U.S. Pat. No. 8,296,926, the above embodiment of the present invention significantly simplifies the structures, reduces the number of wire ends from 384 to 24, and reduces the number of solder joints from 192 to 8.

The number of layers of wires 20 in a groove 33 of a stator 30 of the present invention is not limited to the four layers of wires in the above embodiment. In fact, if necessary, by increasing the depth of the groove 33, the number of wires 20 embedded therein may be increased to, for example, 8 or 16 layers of wires. In this case, power generation efficacy can be enhanced rapidly and effectively.

Further, the wire 20 used in the embodiments of the present invention is not limited to a wire having 16 coils. For example, a wire having 8 coils may be used instead. For the winding in a phase in which a groove of a stator 30 has four wires, four wires having 8 coils are required.

Figure 7:
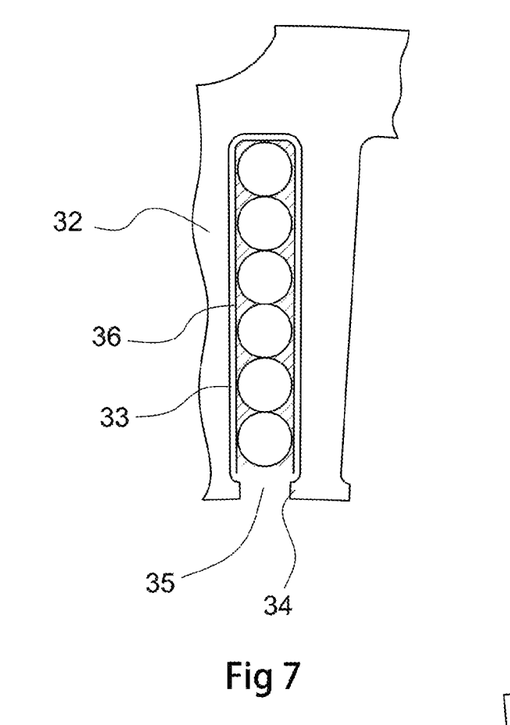
FIG. 7 is a partial, sectional view of a wound stator according to an embodiment of the present invention.
Figure 8:
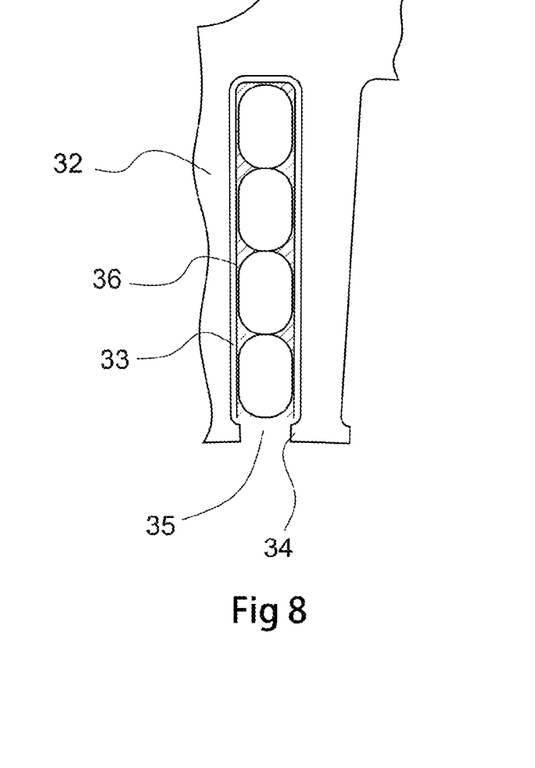
FIG. 8 is a partial, sectional view of a wound stator according to another embodiment of the present invention.

In addition, the structure and winding of the wire 20 enable multiple straight portions 231 of a wire 20 to be embedded in a single groove 33 of a stator 30 and to be arranged in a straight line along a radial direction of the groove 33. Therefore, each of the wires 20 is in contact with or adjacent to separating posts 32 at two sides of the groove 33, and thus air gaps are comparatively small (see the slant lines in FIG. 7). The straight portions 231 of the wire 20 in the groove 33 in FIG. 7 are arranged in order, in contrast to those arranged in disorder of the prior art shown in FIG. 1. Since the air gaps shown in FIG. 7 are clearly smaller than those in FIG. 1, the magnetic fields in the present invention can pass more uniformly through the cross sections of the straight portions 231 of all wires 20 in comparison to the prior art, and magnetic resistance is reduced. As shown in FIG. 8, if the straight portion of a wire is further flattened, the air gaps in the groove 33 can be further reduced and power generation efficacy further enhanced. Further, based on embodiments of the present invention, a smaller width for the groove 33 of the stator 30 can be provided so that the number of grooves can be increased. Accordingly, the stator becomes miniature, and at the same time the number of groups of wire for power generation is increased and power generation efficacy is enhanced.

Generally speaking, the bigger the magnetic shoe, the lower the magnetic leakage phenomenon, and the higher the efficacy of the generator. In a stator having a large number of grooves that are each small, reduction of the size of the magnetic shoe may theoretically increase magnetic leakage phenomenon. Thus, in such a stator, the size of the magnetic shoe should presumably not be very small in comparison to the groove opening. For example, as shown in FIG. 10 of U.S. Pat. No. 8,296,926, the magnetic shoe at the end portion of the separating post nearly closes the groove opening.

In one embodiment of the present invention, the width of the groove 33 of the stator 30 is designed to receive only a single wire 20, and therefore the groove width of the groove 33 is slightly larger than the diameter of the wire 20. In one embodiment, the width of groove 33 exceeds the diameter of wire 20 by 5 to 50 percent of the diameter of wire 20, and in a more specific embodiment the width of groove 33 exceeds the diameter of wire 20 by 5 to 20 percent of the diameter of wire 20. The end of the separating post 32 has a magnetic shoe 34 of a size that makes the opening 35 of the groove 33 close to the width of the groove 33 so that the straight portion 231 of the wire 20 can be directly and completely embedded in the groove 33 from the opening 35. As for the efficacy of power generation, surprisingly, after winding is completed according to the above embodiment of the present invention, the power generation efficacy is close to the case where the size of a magnetic shoe is large and the groove opening is almost closed, as in U.S. Pat. No. 8,296, 926. For example, based on an experiment, with the same stator size, a groove opening of 0.8 mm in the case of a large magnetic shoe in a prior art and a groove opening of between 1.3 mm and 2.0 mm in the case of a small magnetic shoe according to the present invention have similar efficacy. In the condition that the rotational speed of the rotor is 1600 rpm, the former can output a current of 62.9 A, while the latter can output a current of 63.8 A. The latter even has better efficacy than the former. Thus, according to one embodiment of the present invention, the size of the magnetic shoe 34 formed at the end of the separating post 32 of the stator 30 may be reduced so as to increase the size of the opening 35 of the groove 33.

The advantage of the foregoing stator structure in which the size of the magnetic shoe 34 of the stator 30 is decreased to increase the size of the opening 35 of the groove 33 according to the present invention is that the winding of the wire 20 on the stator ring becomes relatively easy. In particular, when the groove opening is smaller than the wire diameter of the wire 20, an insertion manner must be adopted for the winding of the wire, 20 and the winding cannot be efficiently performed. The relatively wide groove opening 35 of the present invention makes it easy for the entire straight portion 231 of the wire 20 to be directly embedded in the groove 33 in the radial direction of the stator ring, thereby significantly lowering the complexity of winding, increasing the winding speed, and making possible automatic winding by using a lead-in wire jig. Thus, production efficiency is improved.

Figure 9:
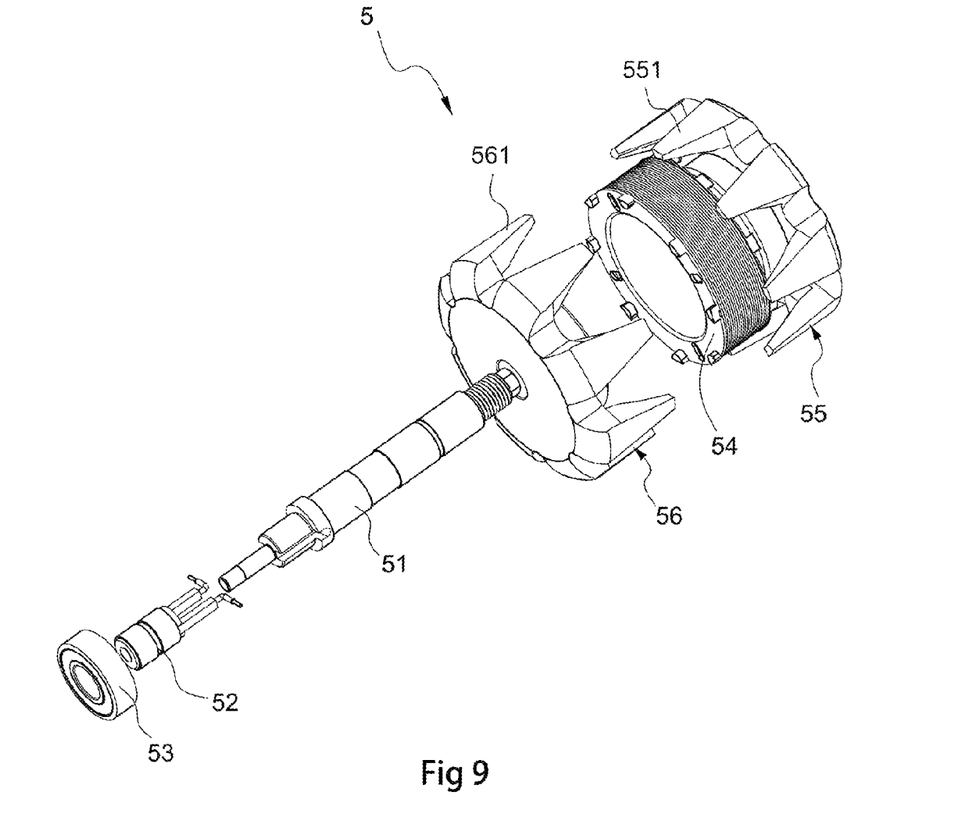
FIG. 9 is an exploded view of a rotor of an alternating-current generator according to an embodiment of the present invention.

The stator winding structure of the present invention illustrated above can be combined with a rotor structure to form a vehicle alternating-current generator assembly, for example, the structure of the rotor 5 shown in FIG. 9. The rotor 5 of the alternating-current generator is rotatable relative to the stator (not shown). The rotor 5 includes a rotating shaft 51, a slip ring 52, a bearing 53, a magnetic field coil 54, a first claw magnetic pole piece 55, and a second claw magnetic pole piece 56. The wound stator of the present invention surrounds the rotor 5 in coaxial form. When electric power from a vehicle storage battery is supplied to the magnetic field coil 54 through the slip ring 52, the first claw magnetic pole piece 55 and the second claw magnetic pole piece 56 may be magnetized under the effect of electromagnetic induction to generate a magnetic field. When the rotor 5 is driven by power from an engine to rotate relative to the wound stator, the direction of the magnetic field also changes with the rotation of the rotor 5; in this case, the stator coil generates an alternating current due to electromagnetic induction.

In particular, when a current is passed through the magnetic field coil 54 of the rotor 5, the first claw magnetic pole piece 55 and the second claw magnetic pole piece 56 may be magnetized into an N pole and an S pole due to electromagnetic induction; in this case, claw bodies 551, 561 of each pair of adjacent claw magnetic pole pieces may generate a magnetic field. During the rotation of the rotor 5, electromagnetic induction also further occurs between the directions of the magnetic fields and the wire 20 in the stator winding to generate an alternating current.

Further, as shown in FIG. 9, the first claw magnetic pole piece 55 of the rotor 5 may have four, six or eight claw bodies 551, while the second claw magnetic pole piece 56 may also have four, six or eight claw bodies 561, in which the number of claw bodies 551 of the first claw magnetic pole piece 55 is the same as the number of claw bodies 561 of the second claw magnetic pole piece 56.

The first claw magnetic pole piece 55 and the second claw magnetic pole piece 56 are combined into magnetic poles in a manner of being engaged to each other so that the claw body 551 of the first claw magnetic pole piece 55 and the claw body 561 of the second claw magnetic pole piece 56 are adjacent to each other in pair and are arranged separately. As discussed above, when a current is passed through a magnetic pole coil of a rotor, the first claw magnetic pole piece 55 may be magnetized into an N pole due to electromagnetic induction, and the second claw magnetic pole piece 56 may be magnetized into an S pole due to electromagnetic induction. Therefore, magnetic lines of force may be generated between each pair of the adjacent claw body 551, of the first claw magnetic pole piece 55 forming the N pole, and claw body 561, of the second claw magnetic pole piece 56 forming the S pole, so as to form a magnetic field. If the magnetic field coil 54 is arranged to be wound in a direction opposite the foregoing magnetic pole coil, the first claw magnetic pole piece 55 is magnetized into the S pole due to electromagnetic induction, and the second claw magnetic pole piece 56 is magnetized into the N pole due to electromagnetic induction. Similarly, magnetic lines of force may also be generated between each pair of the adjacent claw body 551, of the first claw magnetic pole piece 55 forming the S pole, and claw body 561, of the second claw magnetic pole piece 56 forming the N pole so as to form a magnetic field.

Figure 10:
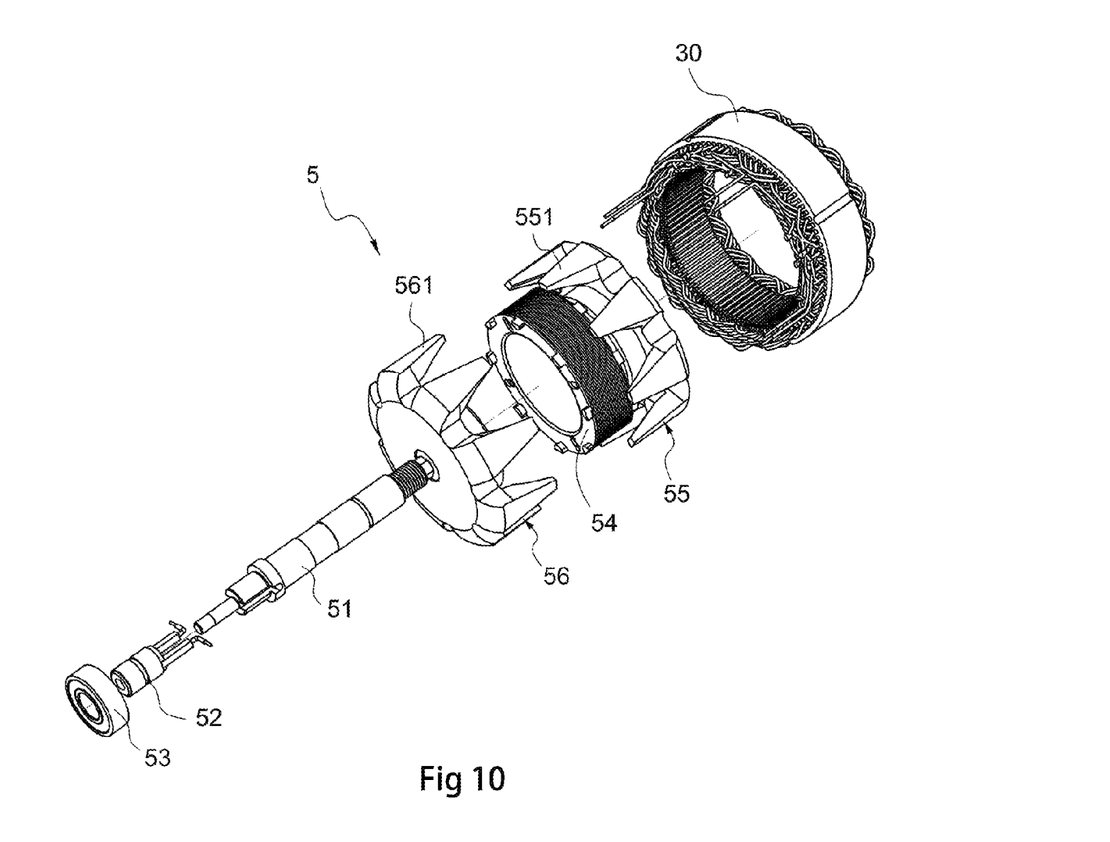
FIG. 10 is a schematic view of a vehicle alternating-current generator according to an embodiment of the present invention, in which a rotor is placed in a wound stator in a coaxial form.

FIG. 10 is a schematic view of a vehicle alternating-current generator according to an embodiment of the present invention. As shown in FIG. 10 and as discussed in the foregoing content, the rotor 5 is received at the center of the wound stator 30 and they are in coaxial form. The rotor 5 is rotatable relative to the wound stator 30, thereby enabling the wires in the wound stator to generate an induced current by means of changes of the magnetic field so as to further output the current and achieve the objective of power generation.

A vehicle alternating-current generator formed of the structure of the rotor 5 illustrated above and the foregoing structure of the stator winding has a miniature structure and also has the characteristic of high power generation efficacy. Meanwhile, the invention simplifies manufacturing procedures and automation, and allows for lower manufacturing costs.

The foregoing embodiments are illustrative of the technical concepts and characteristics of the present invention so as to enable a person skilled in the art to gain insight into the contents disclosed herein and to implement the present invention accordingly. However, it is understood that the embodiments are not intended to restrict the scope of the present invention. Hence, all equivalent modifications and variations made to the disclosed embodiments without departing from the spirit and principle of the present invention should fall within the scope of the appended claims.

What is claimed is:

1. A wound stator for an alternating-current generator, said wound stator comprising:
    a stator, the stator comprising:
        an annular body having a plurality of separating posts protruding inwardly and radially from an inner circumference of the annular body, an end of each of the separating posts extending from its two sides to form a plurality of magnetic shoes; and
        a plurality of radial grooves defined between the separating posts, each of the grooves having an opening defined between adjacent two of the plurality of magnetic shoes; and
    a plurality of wires for the stator, each wire comprising:
        a first end;
        a second end; and
        a plurality of wave-shaped coils located between the first end and second end, each wave-shaped coil being formed of straight portions and curved portions that alternate with each other;
    wherein the straight portions of each wire are, starting from the first end of the wire, sequentially embedded in corresponding grooves of the stator, so that each of the plurality of grooves of the stator is embedded with the wires, the width of each of the plurality of grooves is only sufficient for receiving one wire, and the width of the openings of the plurality of grooves is slightly larger than a wire diameter of the straight portions of the wire, so that the straight portions of the wires can be directly embedded into the grooves from the openings
    wherein the straight portions of each wire are, starting from the first end, sequentially embedded in a forward direction in the corresponding grooves of the stator to surround the stator, each wire twisted in a 180 degree direction, whereby the plurality of straight portions are then sequentially embedded in the corresponding grooves of the stator in a reverse direction and jut out from one of the corresponding grooves with the second end so that each of the corresponding grooves has two layers of wires.

2. The wound stator according to claim 1, wherein an electrical insulating material is laid on all surfaces of the grooves.

3. The wound stator according to claim 1, wherein the stator has 72 to 96 grooves.

4. The wound stator according to claim 1, wherein the plurality of wave-shaped coils of the wires has 6 to 8 curved portions in a same curving direction.

5. The wound stator according to claim 1, wherein the plurality of wave-shaped coils of the wires has 12 to 16 curved portions in a same curving direction.

6. The wound stator according to claim 1, wherein cross sections of the straight portions of the wires have a square shape, a rectangular shape or an elliptic shape.

7. The wound stator according to claim 1, wherein both the cross sections of the straight portions and the curved portions of the wires have a square shape, a rectangular shape or an elliptic shape.

8. The wound stator according to claim 1, wherein the size of the opening is between 1.3 mm and 2.0 mm.

9. The wound stator according to claim 1, wherein the second end of each wire is connected in series to the first end of another wire, and the straight portions of the another wire are, starting from the first end thereof, sequentially embedded in a forward direction in the corresponding grooves of the stator to surround the stator, and are then sequentially embedded in the corresponding grooves of the stator in a reverse direction and jut out from one of the corresponding grooves with the second end of the another wire, so that each of the corresponding grooves has four layers of wires.

10. The wound stator according to claim 9, wherein the second end of each wire is connected in series to the first end of another wire in a soldering manner.

11. The wound stator according to claim 1, wherein the straight portions of each wire are, starting from the first end of the wire, sequentially embedded in a forward direction in the corresponding grooves of the stator to surround the stator and jut out from one of the corresponding grooves with the second end, wherein the second end is further connected in series to the first end of another wire, and the straight portions of the another wire are starting from the first end thereof, sequentially embedded in a reverse direction in the corresponding grooves of the stator and jut out from one of the corresponding grooves with the second end of the another wire, so that each of the corresponding grooves has two layers of wires.

12. The wound stator according to claim 11, wherein the second end of each wire is connected in series to the first end of the another wire in a soldering manner.

13. The wound stator according to claim 1, wherein each groove has two to eight layers of wires.

14. The wound stator according to claim 1,
    wherein a first wire of the plurality of wires comprises a plurality of straight portions, the straight portions of the first wire embedded in a respective plurality of first grooves of the stator,
    wherein a second wire of the plurality of wires comprises a plurality of straight portions, the straight portions of the second wire embedded in a respective plurality of second grooves of the stator, whereby the second grooves are adjacent to the first grooves;
    wherein each of the first wire and the second wire comprises a curved portion extending between successive straight portions, whereby each of the first and second wires comprises a plurality of curved portions; and
    wherein a plurality of the curved portions of the first wire forms crossovers with a respective plurality of curved portions of the second wire, and wherein a plurality of curved portions of the second wire forms crossovers with a respective plurality of the curved portions of the first wire.

\* \* \* \* \*